US009169639B1

(12) United States Patent
Conroy

(10) Patent No.: US 9,169,639 B1
(45) Date of Patent: Oct. 27, 2015

(54) SAFETY ENCLOSURE DEVICES FOR USE WITH DROPPED CEILING GRIDS

(71) Applicant: David Conroy, Bellingham, MA (US)

(72) Inventor: David Conroy, Bellingham, MA (US)

(*) Notice: Subject to any disclaimer, the term of this patent is extended or adjusted under 35 U.S.C. 154(b) by 0 days.

(21) Appl. No.: 14/486,166

(22) Filed: Sep. 15, 2014

Related U.S. Application Data

(63) Continuation-in-part of application No. 13/793,335, filed on Mar. 11, 2013, now abandoned.

(51) Int. Cl.
| | |
|---|---|
| *E04B 2/00* | (2006.01) |
| *E04C 2/52* | (2006.01) |
| *H01B 17/00* | (2006.01) |
| *F16B 33/00* | (2006.01) |
| *H01B 7/00* | (2006.01) |
| *H01B 17/26* | (2006.01) |
| *E04B 1/92* | (2006.01) |
| *E04D 15/00* | (2006.01) |
| *H02G 3/04* | (2006.01) |

(52) U.S. Cl.
CPC . *E04B 1/92* (2013.01); *E04D 15/00* (2013.01); *H02G 3/04* (2013.01)

(58) Field of Classification Search
CPC ..... C25C 7/02; E04B 9/068; E04B 2009/062; E04B 9/067; E04B 9/045; H01R 4/2416; H01R 4/70; H02G 3/04; H02G 3/381
USPC .......... 52/506.6, 506.7, DIG. 8, 220.6, 220.8; 174/137 R, 138 R, 138 G, 135, 142, 148, 174/195
See application file for complete search history.

(56) References Cited

U.S. PATENT DOCUMENTS

| | | | |
|---|---|---|---|
| 1,988,435 A * | 1/1935 | Beebe | 174/5 R |
| 2,228,363 A | 1/1941 | Pinney | |
| 3,159,251 A | 12/1964 | Becker | |
| 3,317,650 A | 5/1967 | Padellford | |
| 3,590,135 A * | 6/1971 | Herbenar et al. | 174/491 |
| 3,596,134 A | 7/1971 | Burke | |
| 3,642,096 A * | 2/1972 | Valentine | 182/46 |
| 3,782,495 A | 1/1974 | Nassof | |
| 3,828,506 A | 8/1974 | Phillips | |
| 3,857,397 A | 12/1974 | Brosseau | |
| 3,936,990 A | 2/1976 | Garrison, Jr. et al. | |
| 3,969,865 A | 7/1976 | Andersen | |
| 4,055,930 A * | 11/1977 | Weinar et al. | 52/718.01 |
| 4,092,813 A * | 6/1978 | Eggert | 52/716.5 |
| 4,243,118 A | 1/1981 | Landry | |
| 4,611,444 A | 9/1986 | Nassof | |
| 4,631,786 A | 12/1986 | Curry | |
| 4,769,958 A | 9/1988 | Limp | |
| RE32,820 E * | 1/1989 | Pollack | 174/68.3 |
| 4,986,050 A | 1/1991 | Brunetti et al. | |
| 5,026,588 A * | 6/1991 | Diekmann | 428/100 |

(Continued)

FOREIGN PATENT DOCUMENTS

DE        4005057        8/1990

*Primary Examiner* — Phi A
*Assistant Examiner* — Omar Hijaz
(74) *Attorney, Agent, or Firm* — Goldstein Law Offices, P.C.

(57) ABSTRACT

An electrically insulative frame configured for attachment to a dropped ceiling grid, having a plurality of cells formed by cell members, including an open cell having a cell opening. The frame insulates the cell opening when attached therein. A worker, having a head and torso, may extend his/her head and torso through the frame while being electrically insulated from the cell.

11 Claims, 10 Drawing Sheets

(56) References Cited

U.S. PATENT DOCUMENTS

| | | | |
|---|---|---|---|
| 5,033,247 A | 7/1991 | Clunn | |
| 5,115,616 A * | 5/1992 | Nixon | 52/144 |
| 5,732,747 A | 3/1998 | Holliday | |
| 6,147,854 A | 11/2000 | Kirschner | |
| 6,193,862 B1 * | 2/2001 | Cutmore et al. | 204/281 |
| 6,274,012 B1 * | 8/2001 | Santoyo | 204/279 |
| 6,429,379 B1 * | 8/2002 | Yoshigi | 174/138 E |
| 6,452,096 B1 * | 9/2002 | Childers | 174/50 |
| 6,701,686 B1 | 3/2004 | Platt | |
| 6,702,933 B2 * | 3/2004 | Alexander | 204/279 |
| 6,746,581 B2 * | 6/2004 | Ebert | 204/279 |
| 7,806,231 B1 * | 10/2010 | Jackson | 182/2.4 |
| 7,918,911 B2 | 4/2011 | Cursetjee et al. | |
| 7,993,434 B2 | 8/2011 | Oscar | |
| 8,052,851 B1 * | 11/2011 | Steen | 204/281 |
| 8,146,316 B2 | 4/2012 | Boss et al. | |
| 8,176,700 B2 * | 5/2012 | Butcher et al. | 52/506.07 |
| 8,375,670 B2 * | 2/2013 | Hysky | 52/506.06 |
| 2002/0108323 A1 * | 8/2002 | Gruber | 52/177 |
| 2005/0268449 A1 * | 12/2005 | Medina et al. | 29/281.1 |
| 2006/0117726 A1 | 6/2006 | Moreno | |
| 2009/0000231 A1 | 1/2009 | Burns | |
| 2009/0000248 A1 | 1/2009 | Waters et al. | |
| 2010/0139190 A1 | 6/2010 | Lehane et al. | |
| 2011/0072743 A1 | 3/2011 | Brescia | |
| 2012/0079788 A1 * | 4/2012 | Floren et al. | 52/741.4 |
| 2013/0160386 A1 * | 6/2013 | Gulbrandsen | 52/506.06 |

\* cited by examiner

SAFETY ENCLOSURE DEVICES FOR USE WITH DROPPED CEILING GRIDS

CROSS REFERENCE AND RELATED SUBJECT MATTER

This application is a continuation-in-part of U.S. patent application Ser. No. 13/793,335, filed in the United States Patent Office on Mar. 11, 2013.

TECHNICAL FIELD

Generally, the present disclosure relates to avoiding inherent hazards when working within dropped ceilings. More particularly, the present disclosure relates to systems for preventing electric shock when working within dropped ceiling grids.

BACKGROUND

In the present disclosure, where a document, an act and/or an item of knowledge is referred to and/or discussed, whether directly and/or indirectly, then this reference and/or discussion is not an admission that the document, the act and/or the item of knowledge and/or any combination thereof was at the priority date, publicly available, known to the public, part of common general knowledge and/or otherwise constitutes prior art under the applicable statutory provisions and/or is known to be relevant to an attempt to solve any problem with which the present disclosure is concerned.

Many buildings contain a dropped ceiling system, which includes a grid supported by the structural ceiling of the building. The grid includes a plurality of cells, which each have a large opening extending vertically therethrough, which is normally spanned by a ceiling tile. The region between the cells and the structural ceiling frequently contains wiring and ductwork. When the dropped ceiling is fully installed, tiles, panels, vents, and light fixtures occupy the cells and conceal the wiring and ductwork.

Sometimes, such as for retrofitting and/or repairs, alterations and/or removal of the wiring and/or the ducts, a person, such as an electrician and/or an heating, ventilation and air conditioning (HVAC) technician, needs to obtain access to the area between the structural ceiling and the dropped ceiling. The person/worker/user places a ladder below one of the tiles, panels, light fixtures and/or vents, climbs several steps on the ladder to reach the one of the tiles, panels, light fixtures and/or vents and removes it such that the opening of one of the cells is uncovered. To gain a better view and/or the ability to work within the region above the grid, the person then might climb several more steps on the ladder, protruding his or her head and body through the opening, such as to be waist-level with the grid within the one of the openings.

Due to obvious safety concerns, building codes often prohibit exposed high voltage electrical equipment in the area between the structural ceiling and the dropped ceiling. For example, for safety purposes, many jurisdictions prohibit an unexposed wire over 30 volts to be present in the area between the structural ceiling and the dropped ceiling. Despite such prohibitions, however, many building operators are not compliant. Further, high voltage wiring can become exposed due to equipment deterioration, due to moisture and component rusting, and animals, such as mice, rats and/or squirrels. Moreover, such equipment can become exposed due to human error, such as when others inadvertently leave such equipment exposed when accessing the area between the structural ceiling and the dropped ceiling.

Accordingly, while the person is standing on the ladder, such as by being waist-level with the cell and within the one of the openings, the person can come in contact with such equipment, whether directly and/or indirectly. If, during the contact, such equipment is operating, then the person can become a conduit for high voltage electric current, which can lead to the person's injury and/or death. Although some wearable devices have been created to ground persons in such situations, such devices are typically inconvenient to use, bulky to wear, complex to install, limit maneuverability and/or interfere with task performance.

While certain aspects of conventional technologies have been discussed to facilitate the present disclosure, no technical aspects are disclaimed. The claims may encompass one and/or more of the conventional technical aspects discussed herein.

BRIEF SUMMARY

An example embodiment of the present disclosure includes a frame which may include a plurality of frame components configured for attachment to a dropped ceiling grid cell having an opening therethrough. The components form a frame fully enclosing/insulating the opening when attached to the cell.

Another example embodiment of the present disclosure includes a device, which comprises a unitary frame configured for attachment to a dropped ceiling grid cell having a cell opening therethrough. The frame fully enclosing the opening when attached to the cell. The frame is electrically insulating. The frame is sized to fit a user therethrough. The frame is sized to allow a person to extend therethrough. The frame may be temporarily installed by using it to line the opening prior to a user/worker extending his/her body upwardly through the frame opening to work in an area above the grid, and then may be removed after the work is complete.

Yet another example embodiment of the present disclosure includes a structure, which comprises a dropped ceiling grid having a cell with an opening therethrough. The structure also comprises a frame attached to the cell. The frame fully insulates the opening. The frame is sized to fit a user therethrough.

The present disclosure describes an electrically insulative frame configured for attachment to a dropped ceiling grid, having a plurality of cells including an open cell having a cell opening. The frame lines the cell opening when attached to the cell. A worker, having a head and torso, may extend his/her head and torso through the frame while being electrically insulated from the cell.

The present disclosure may be embodied in the form illustrated in the accompanying drawings. Attention is called to the fact, however, that the drawings are illustrative. Variations are contemplated as being part of the disclosure, limited only by the scope of the claims.

BRIEF DESCRIPTION OF THE DRAWINGS

The accompanying drawings illustrate example embodiments of the present disclosure. Such drawings are not to be construed as necessarily limiting the disclosure. Like numbers and/or similar numbering scheme can refer to like and/or similar elements throughout.

DETAILED DESCRIPTION OF THE PREFERRED EMBODIMENTS

Figure 1:
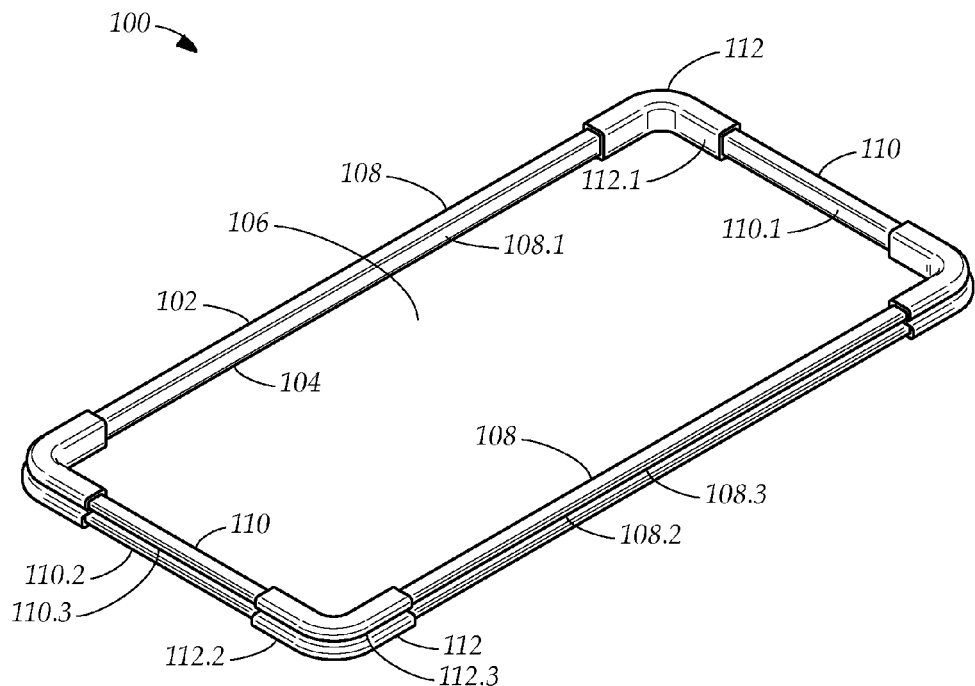
FIG. 1 shows a perspective view of an example embodiment of an enclosure device for use with a dropped ceiling grid cell according to the present disclosure.

The present disclosure will now be described more fully with reference to the accompanying drawings, in which example embodiments of the disclosure are shown. The disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art. Also, features described with respect to certain embodiments may be combined in various other embodiments. Different aspects and elements of the embodiments may be combined in a similar manner.

Any verbs as used herein can imply direct or indirect, full or partial, action or inaction. For example, when an element is referred to as being "on," "connected" or "coupled" to another element, then the element can be directly connected or coupled to the other element or intervening elements may be present. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the disclosure are described herein with reference to illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein, but are to include deviations in shapes that result, for example, from manufacturing. Any components and/or materials can be formed from a same, structurally continuous piece and/or be separately manufactured and/or connected.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and will not be interpreted in an idealized or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of the device in addition to the orientation depicted in the accompanying drawings. For example, if the device in the accompanying drawings is turned over, elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

FIG. 1 shows a perspective view of an example embodiment of an enclosure device 100 for use with a dropped ceiling grid cell according to the present disclosure.

The enclosure device 100 includes a frame 102, which is configured for attachment to a dropped ceiling grid cell. The frame 102 is unitary. In an alternative example embodiment, frame 102 can be formed, whether on and/or off the cell, via a set including at least two frame components. In another alternative example embodiment, frame 102 can include a unitary portion and a frame component portion. The frame 102 is light in weight to avoid damaging the cell and/or the grid.

Frame 102 has an interior perimeter 104 fully defining an opening area 106 that is nearly as big as the frame 102. Accordingly, perimeter 104 is sized such that a person, such as electrician and/or HVAC technician, can pass through the opening area 106 defined by the perimeter 104 when frame 102 is attached to the cell. Although perimeter 104 is shown as rectangular, perimeter 104 can have other shapes, whether asymmetrical or symmetrical, such as square or circular. Although area 106 is rectangular, area 106 can have other shapes, whether asymmetrical or symmetrical, such as square or circular.

The frame 102 is electrically insulating to help prevent an electric shock to the user when the user extends his or her body through the opening 106. Such insulation effectively resists current flow for current at least typical to electrical equipment and/or wiring often used at least in residential, industrial and/or commercial environments, whether alternating current (AC) and/or direct current (DC). In a structure, for instance a building, such equipment and/or wiring can often be found in an area between a structural ceiling of the building and a dropped ceiling grid that depends from the structural ceiling and has numerous cells. Such insulation effectively prevents an electrical circuit from being formed between the cell and a conductor, such as a live wire above the cell, through a user with the user being in-circuit between the cell and the conductor when the user is in contact with the cell and the conductor. For such insulation, frame 102 can include sufficiently insulating material, such as glass, paper, porcelain, plastic, rubber, wood, wax, teflon and/or other insulating materials in any permutational combination thereof. For example, frame 102 can be insulated at least for any voltage between 0 volts and 5,000 volts, whether AC or DC.

Any and/or all sections and/or sides of frame 102 can be rigid, flexible, aligned, misaligned, symmetrical, asymmetrical, linear, non-linear, wavy, non-wavy, identical in height, non-identical in height, for single use, reusable, smooth, rough, flush with the cell, non-flush with the cell, even leveled, non-even leveled and/or any permutational combination thereof. Any and/or all sections of frame 102 can engage with each other before, during and/or after attachment, irrespective of their placement with respect to each other, such as via interlocking, intermeshing, interconnecting, interlinking, joining, male-female relating, uniting, connecting, coupling, snapping, clipping, nesting, inserting, fastening, threading and/or other ways in any permutational combinations thereof. Alternatively, any and/or all sections of frame 102 can avoid engaging with each other when immediately adjacent to each other, such as via just being placed immediately adjacent to each other.

Any and/or all sections and/or sides of frame 102 can be identical, whether in size, weight and/or properties, to each other, different from each other and/or any in permutational combination thereof. Any and/or all sections and/or sides of frame 102 can be parallel or non-parallel, whether convergent and/or divergent, to each other. Any and/or all sections and/or sides of frame 102 can attach to a dropped ceiling cell, such as via interlocking, intermeshing, interconnecting, interlinking, joining, uniting, connecting, coupling, snapping, clipping, nesting, inserting, fastening and/or other ways in any permutational combinations thereof. Any and/or all sections and/or sides of frame 102 can be C-shaped, U-shaped, V-shaped, W-shaped, E-shaped, F-shaped, G-shaped, H-shaped, j-shaped, K-shaped, M-shaped, N-shaped, R-shaped, X-shaped, Y-shaped, whether with serifs and/or no serifs, and/or any permutational combinations thereof.

Frame 102 has longitudinal frame sections 108, lateral frame sections 110 and corner frame sections 112.

Sections 108 are operative to extend longitudinally along the cell's length. Alternatively, sections 108 can be used laterally along the cell's width. Sections 108 have interior sides 108.1 and exterior sides 108.2. Sides 108.1 face area 106. Although sides 108.1 are generally flat, sides 108.1 can be non-flat. Sides 108.2 avoid facing area 106 and face the cell when attached to the cell. Sides 108.2 have longitudinal channels 108.3 therein, which can be identical and/or non-identical in any permutational combination thereof. When the cell includes T-shaped cell elements defined by arms protruding sideways from legs, then channels 108.3 are in receipt of one of the arms for duration of attachment to the cell element. Alternatively, any and/or all sides 108.2 can be structured to attach to the cell in other ways, such as via interlocking, intermeshing, interconnecting, interlinking, joining, uniting, connecting, coupling, snapping, clipping, nesting, inserting, fastening and/or others in any permutational combinations thereof.

Sections 110 are operative to extend laterally along the cell's width. Alternatively, sections 110 can be used longitudinally along the cell's length. Sections 110 have interior sides 110.1 and exterior sides 110.2. Sides 110.1 face area opening 106. Although sides 110.1 are generally flat, sides 110.1 can be non-flat. Sides 110.2 avoid facing area 106 and face the cell when attached to the cell. Sides 110.2 have lateral channels 110.3 therein, which can be identical and/or non-identical in any permutational combination thereof. When the cell includes T-shaped cell elements defined by arms protruding sideways from legs, then channels 110.3 are in receipt of one of the arms for duration of attachment to the cell element. Alternatively, any and/or all sides 110.2 can be structured to attach to the cell in other ways, such as via interlocking, intermeshing, interconnecting, interlinking, joining, uniting, connecting, coupling, snapping, clipping, nesting, inserting, fastening and/or others in any permutational combinations thereof.

Sections 112 are operative to extend along the cell's corners. Alternatively, frame 102 can lack sections 112. Any and/or all sections 112 can be angled in various ways, such as an acute angle, an obtuse angle and/or a right angle. Whether internally, such as facing area 106, and/or externally, such as not facing area 106, any and/or all sections 112 can be rounded, sharp and/or any permutational combinations thereof. Any and/or all sections 112 can attach to the cell to be fully covering the cell's corner and be snug with the cell's corner and/or non-fully covering the cell's corner and not be snug with the cell's corner.

Sections 112 have interior sides 112.1 and exterior sides 112.2. Sides 112.1 face area 106. Although sides 112.1 are generally flat, sides 112.1 can be non-flat. Sides 112.2 avoid facing area 106 and face the cell when attached to the cell. Sides 112.2 have corner channels 112.3 therein, which can be identical and/or non-identical in any permutational combination thereof. When the cell includes T-shaped cell elements defined by arms protruding sideways from leg, then channels 112.3 are in receipt of one of the arms for duration of attachment to the cell element. Alternatively, any and/or all sides 112.2 can be structured to attach to the cell in other ways, such as via interlocking, intermeshing, interconnecting, interlinking, joining, uniting, connecting, coupling, snapping, clipping, nesting, inserting, fastening and/or others in any permutational combinations thereof.

Figure 2:
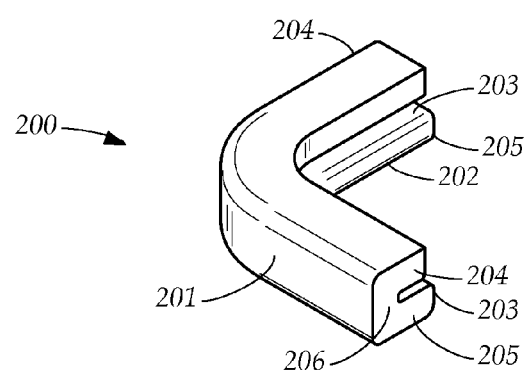
FIG. 2 shows a perspective view of an example embodiment of a corner portion of an enclosure device for use with a dropped ceiling grid according to the present disclosure.

FIG. 2 shows a perspective view of an example embodiment of a corner portion of an enclosure device for use with a dropped ceiling grid cell according to the present disclosure. Some elements of this figure are described above. Thus, same and/or similar reference characters identify same and/or like components described above and any repetitive detailed description thereof will hereinafter be omitted or simplified in order to avoid complication.

A section 200 is a corner portion. Section 200 is operative to extend along the cell's corner when frame 102 encloses a plurality of grid cells. Section 200 can engage and/or non-engage with other frame 102 sections, such as sections 108, 112 and 110. Section 200 can be angled in various ways, such as an acute angle, an obtuse angle or a right angle. Section 200 can be rounded, sharp and/or any combinations thereof. Section 200 has an interior side 201 and an exterior side 202. Side 201 faces area 106. Although side 201 is generally flat, side 201 can be non-flat. Side 202 avoids facing area 106 and faces the cell when attached to the cell. Side 202 has a corner channel 203 therein between an upper portion 204 and a lower portion 205. Portions 204 and 205 can be identical or non-identical in size and/or structure. Channel 203 and portions 204 and 205 can be C-shaped, U-shaped, j-shaped, with serifs and/or without serifs, and/or any other shapes as described herein. When the cell includes a T-shaped cell element defined by arms protruding sideways from a leg, then channel 203 is in receipt of one of the arms for duration of attachment to the cell element. Alternatively, side 202 can be structured to attach to the cell in other ways, such as via interlocking, intermeshing, interconnecting, interlinking, joining, uniting, connecting, coupling, snapping, clipping, nesting, inserting, fastening and/or others in any combinations thereof. Section 200 can include a tunnel, such as C-shape, i-shaped or U-shape tunnel, via portion 204 and 205 connected through a connecting portion 206.

Figure 3A:
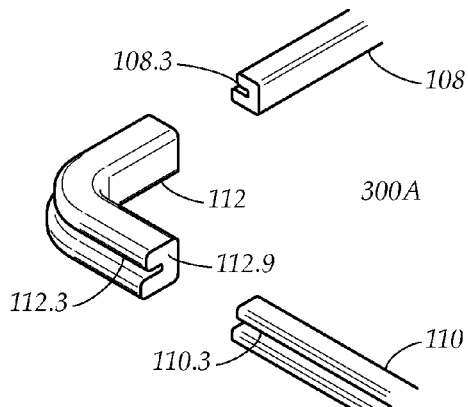
FIG. 3A shows a perspective view of an example embodiment of a corner portion of an enclosure device for use with a pair of side portions of the enclosure device according to the present disclosure.

FIG. 3A shows a perspective view of an example embodiment of a corner portion of an enclosure device for use with a pair of side portions of the enclosure device according to the present disclosure. Some elements of this figure are described above. Thus, same and/or similar reference characters identify same and/or like components described above and any repetitive detailed description thereof will hereinafter be omitted or simplified in order to avoid complication.

An embodiment 300A includes longitudinal section 108, lateral section 110 and corner section 112. Sections 108 and 110 avoid engaging with section 112. Sections 108, 110 and 112 attach to the cell independently on their own and when attached to the cell, section 112 is between sections 108 and 110 with sections 108 and 110 being immediately adjacent to section 112. Any and/or all channels 108.3, 110.3 and 112.3 can be aligned with each other or non-aligned with each other. In another embodiment, an electrically insulating adhesive can be placed in-between sections 108 and 112 and/or 110 and 112.

Alternatively, section 112 includes a tunnel 112.9, which is structured to receive a portion of section 110, which can be done while any and/or all sections 110 and 112 are attached to the cell, such as via sliding, or not. Such receipt allows for snug and/or non-snug nesting of the portion of section 110 within tunnel 112.9. Similarly, section 108 can be inserted into tunnel 112.9 on another side of section 112. Also alternatively, sections 108 and 110 can include tunnels for with section 112 being inserted thereto.

Figure 3B:
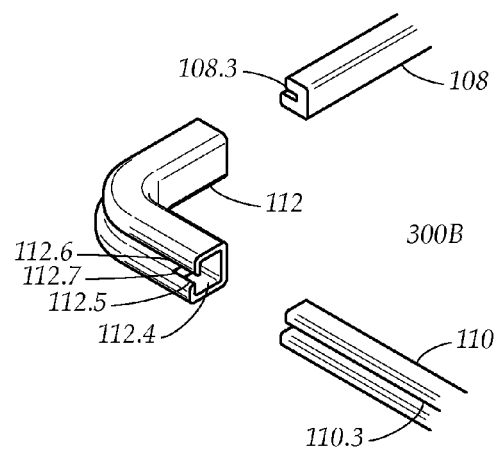
FIG. 3B shows a perspective view of another example embodiment of a corner portion of an enclosure device for use with a pair of side portions of the enclosure device according to the present disclosure.

FIG. 3B shows a perspective view of another example embodiment of a corner portion of an enclosure device for use with a pair of side portions of the enclosure device according to the present disclosure. Some elements of this figure are described above. Thus, same and/or similar reference characters identify same and/or like components described above and any repetitive detailed description thereof will hereinafter be omitted or simplified in order to avoid complication.

An embodiment 300B includes includes longitudinal section 108, lateral section 110 and corner section 112, which has an interior space 112.4, a lower tooth 112.5, an upper tooth 112.6 and a snap or mater 112.7.

Section 110 engages with section 112 when section 110 is inserted into space 112.4 to attach to section 112 via snapping or mating of channel 110.3 into snap or mater 112.7, with channel 112.3 serving as a female portion and snap or mater 112.7 serving as a male portion. Teeth 112.5 and 112.6 ensure that section 110 stays secure within space 112.4 and does not wiggle. Similar engagement occurs with section 108 and section 112. Any and/or all channels 108.3, 110.3 and 112.3 can be aligned with each other or non-aligned with each other.

Figure 3C:
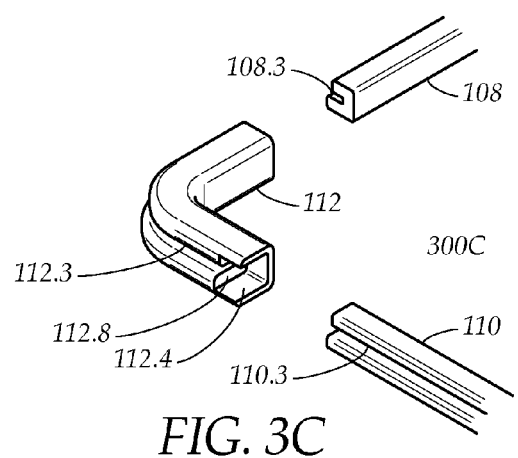
FIG. 3C shows a perspective view of yet another example embodiment of a corner portion of an enclosure device for use with a pair of side portions of the enclosure device according to the present disclosure.

FIG. 3C shows a perspective view of yet another example embodiment of a corner portion of an enclosure device for use with a pair of side portions of the enclosure device according to the present disclosure. Some elements of this figure are described above. Thus, same and/or similar reference characters identify same and/or like components described above and any repetitive detailed description thereof will hereinafter be omitted or simplified in order to avoid complication.

An embodiment 300C includes longitudinal section 108, lateral section 110 and corner section 112, which lacks teeth 112.5 and 112.6, but includes a side 112.8.

Section 110 engages with section 112 when section is inserted into space 112.4 such that section 110 and side 112.8 are immediately adjacent to each other within space 112.4. Any and/or all channels 108.3, 110.3 and 112.3 can be aligned with each other or non-aligned with each other.

Figure 4:
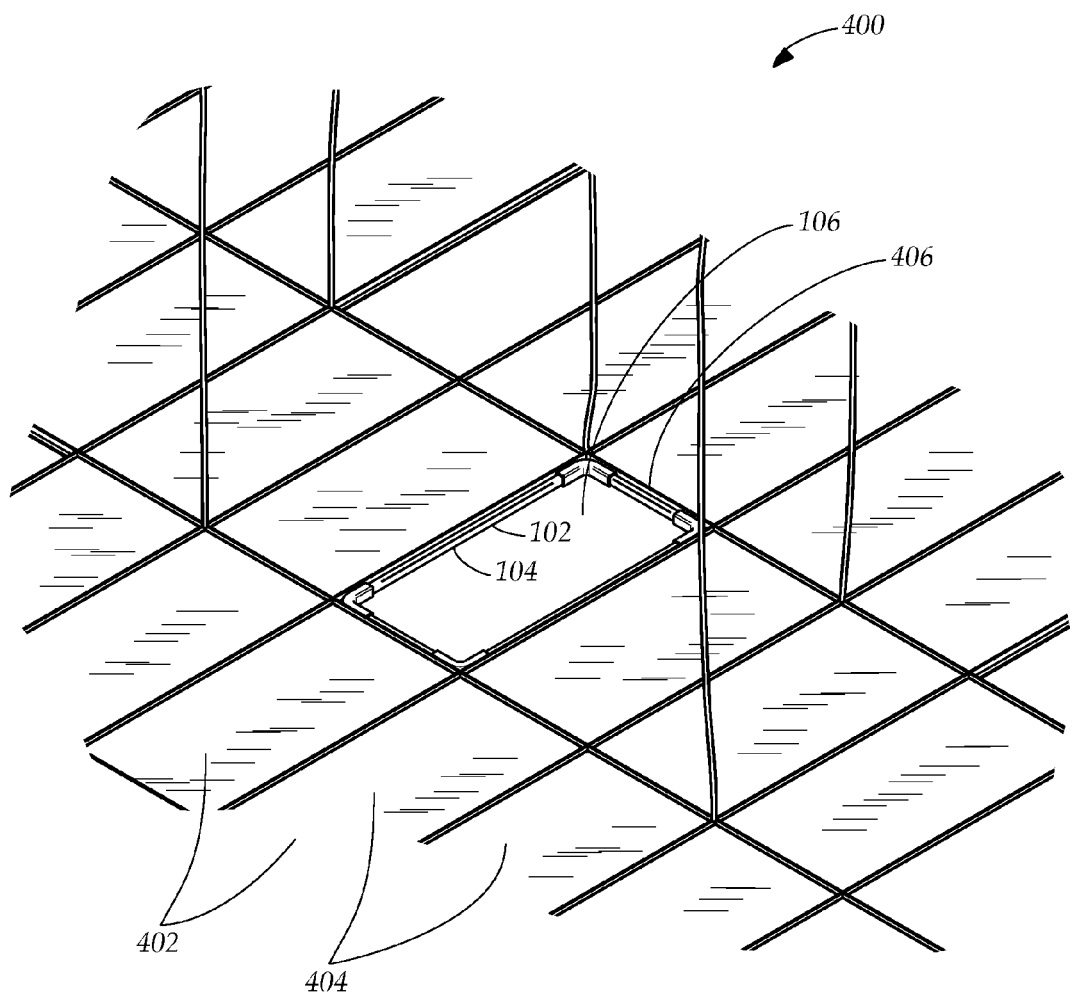
FIG. 4 shows a perspective view of an example embodiment of an enclosure device installed onto a dropped ceiling grid cell according to the present disclosure.

FIG. 4 shows a perspective view of an example embodiment of an enclosure device installed onto a dropped ceiling grid cell according to the present disclosure. Some elements of this figure are described above. Thus, same and/or similar reference characters identify same and/or like components described above and any repetitive detailed description thereof will hereinafter be omitted or simplified in order to avoid complication.

A dropped ceiling grid 400 includes a plurality of cells 402 having openings therethrough. Cells 402 and/or their openings can have various shapes, such as rectangular, square and/or others. Each of the openings is covered by a covering 404, such as a tile, such as fiberglass or plastic, a panel, a light fixture or a vent. Grid 400 can be within a structure, such as a residential, office and/or commercial building, or within a vessel, such as a cruise ship. The structure and/or the vessel can have multiple grids 400 therein, such as on different floors and/or same floor, whether above and/or below ground level, whether identical and/or non-identical. Cells 402 can be identically sized, non-identically sized and/or any permutational combinations thereof. Cells 402 can be aligned, misaligned, level, non-level and/or any combinations thereof. Cells 402 are electrically conductive.

Grid 400 includes a cell 406 whose opening is uncovered. Cell 406 is fully enclosed or lined by frame 102 having perimeter 104 enclosing area 106. Perimeter 104 is sized such that a person, such as an HVAC technician, can fit therethrough, with and/or without equipment. If the person comes in contact with operating conductive electrical equipment above cell 406, such as a live wire, then if the person comes in contact with frame 102, whether directly and/or indirectly, such as via personal equipment, then frame 102 prevents circuit formation between the equipment and cell 406 with the person being part of the circuit as a current conduit between the equipment and cell 406.

Figure 5:
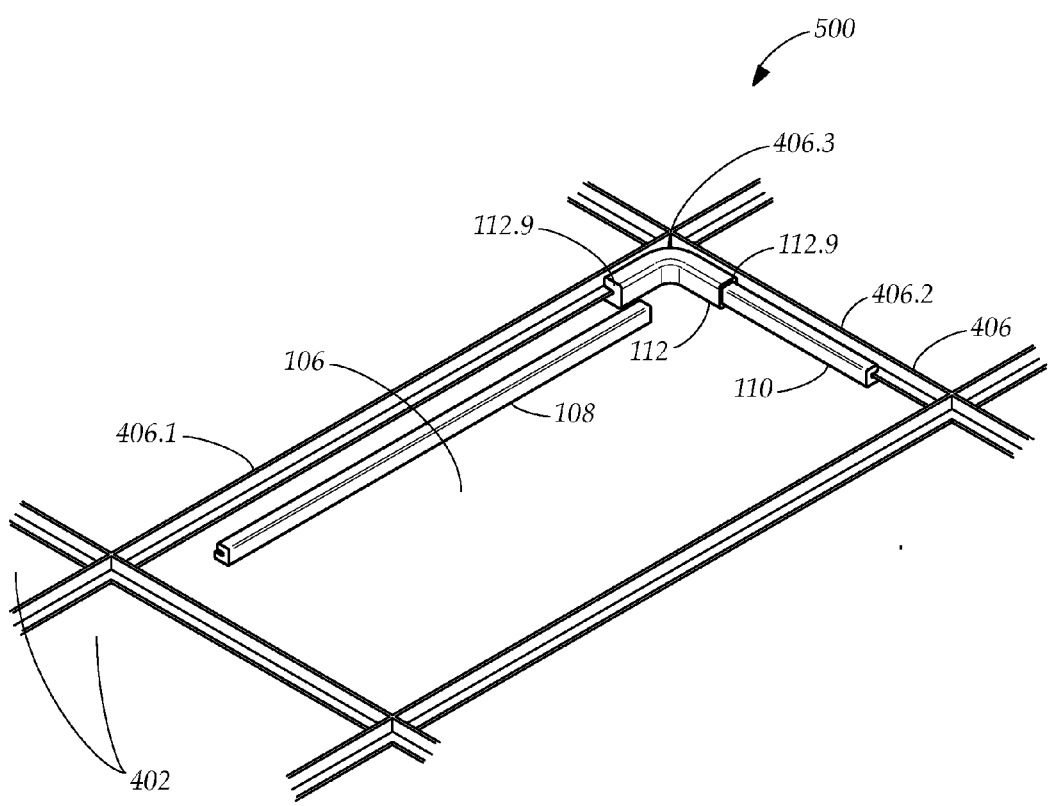
FIG. 5 shows a perspective view of an example embodiment of an enclosure device being assembled for installation onto a dropped ceiling grid cell according to the present disclosure.

FIG. 5 shows a perspective view of an example embodiment of an enclosure device being assembled for installation onto a dropped ceiling grid cell according to the present disclosure. Some elements of this figure are described above. Thus, same and/or similar reference characters identify same and/or like components described above and any repetitive detailed description thereof will hereinafter be omitted or simplified in order to avoid complication.

A set up 500 depicts frame 102 being manually assembled. Cell 406 includes a longitudinal cell element 406.1, a lateral cell element 406.2 and a cell corner element 406.3. Section 110 is attached to element 406.2 with more space available on element 406.2 for another section 112. Already attached to cell 406, section 112 includes tunnel 112.9 and section 110 is partially within tunnel 112.9, such as via slidable nesting. Section 112 is attached to elements 406.3, 406.2 and 406.1. Section 112 can snugly or non-snugly engage with cell corner element 406.3. Section 108 is about to be attached to element 406.1. Section 108 can be placed immediately adjacent to section 112 without engaging section 112 or section 108 can be partially placed inside tunnel 112.9, such as via slidable nesting.

Figure 6A:
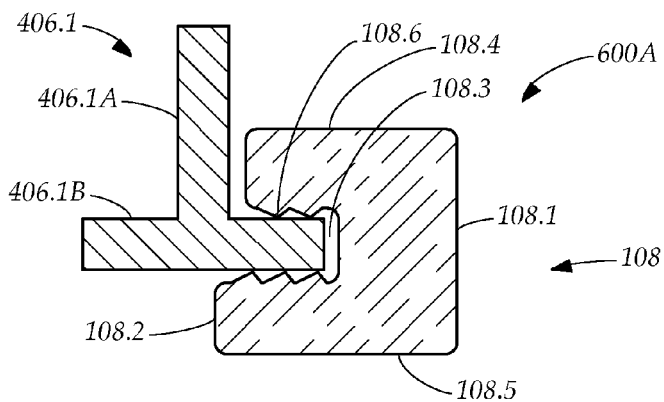
FIG. 6A shows a side view of an example embodiment of a side portion of an enclosure device in contact with a dropped ceiling grid cell element according to the present disclosure.

FIG. 6A shows a side view of an example embodiment of a side portion of an enclosure device in contact with a dropped ceiling grid cell element according to the present disclosure. Some elements of this figure are described above. Thus, same and/or similar reference characters identify same and/or like components described above and any repetitive detailed description thereof will hereinafter be omitted or simplified in order to avoid complication.

A setup 600A includes a T-shaped cell element 406.1 having a leg 406.1A and a plurality of arms 406.1B protruding sideways from leg 406.1A. At least one of the arms 406.1B can include a lip curving toward leg 406.1A.

Section 108 includes external side 108.1, internal side 108.2, channel 108.3, a top side 108.4, a bottom side 108.5 and a plurality of opposing teeth 108.6 within channel 108.3. Section 108.1 faces area 106. Section 108.2 avoids facing area 106. Channel 108.3 is in receipt of one of arms 406.1B. Side 108.4 faces an area, such as plenum, between the grid and the structural ceiling. Side 108.5 faces a ground level. Teeth 108.6, which can be identically and/or non-identically serrated, engage one of arms 406.1B, such as via pressure and/or friction, such that section 108 is attached to element 406.1. Teeth 108.6 can be unitary to section 108 or be attached, individually and/or as a set, to section 108. Teeth 108.6 are electrically insulating, as described herein.

Figure 6B:
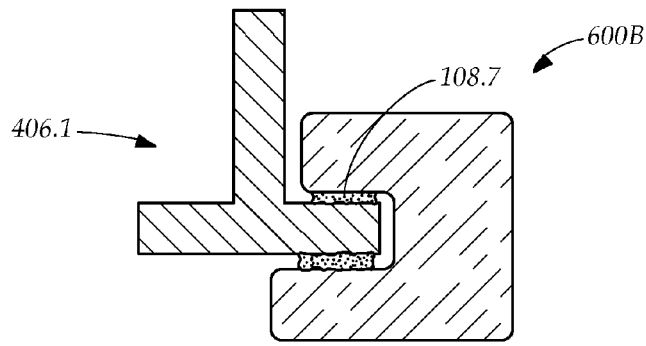
FIG. 6B shows a side view of another example embodiment of a side portion of an enclosure device in contact with a dropped ceiling grid cell element according to the present disclosure.

FIG. 6B shows a side view of another example embodiment of a side portion of an enclosure device in contact with a dropped ceiling grid cell element according to the present disclosure. Some elements of this figure are described above. Thus, same and/or similar reference characters identify same and/or like components described above and any repetitive detailed description thereof will hereinafter be omitted or simplified in order to avoid complication.

Channel 108.3 includes adhesives 108.7, which adhere to one of arms 406.1B such that section 108 is attached to element 406.1. Adhesives 108.7 are electrically insulating, as described herein. Adhesives 108.7 can allow for temporary and/or permanent adhesion.

Figure 6C:
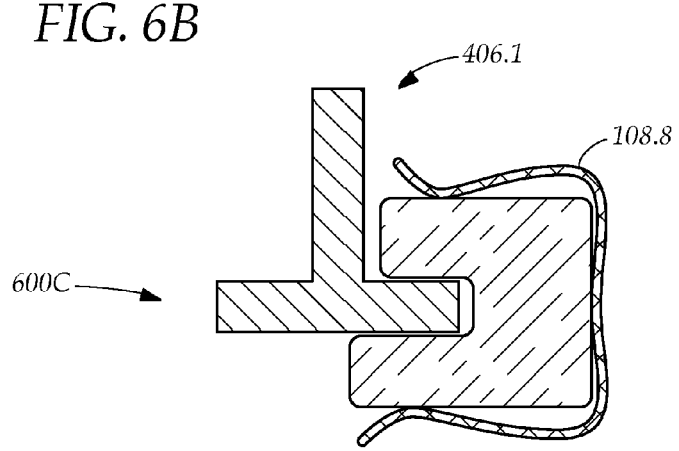
FIG. 6C shows a side view of yet another example embodiment of a side portion of an enclosure device in contact with a dropped ceiling grid cell element according to the present disclosure.

FIG. 6C shows a side view of yet another example embodiment of a side portion of an enclosure device in contact with a dropped ceiling grid cell element according to the present disclosure. Some elements of this figure are described above. Thus, same and/or similar reference characters identify same and/or like components described above and any repetitive detailed description thereof will hereinafter be omitted or simplified in order to avoid complication.

Channel 108.3 is in direct contact with one of arms 406.1B. Bracket 108.8, which can be biased, is mounted over section 108 to apply attaching pressure to section 108 such that section 108 remains attached to element 406.1. Bracket 108.8 can extend along the entire length of section 108. Alternatively, a plurality of brackets 108.8, such as three or five, can be mounted over section 108 in different places. Bracket 108.8 is electrically insulating, as described herein.

Figure 7A:
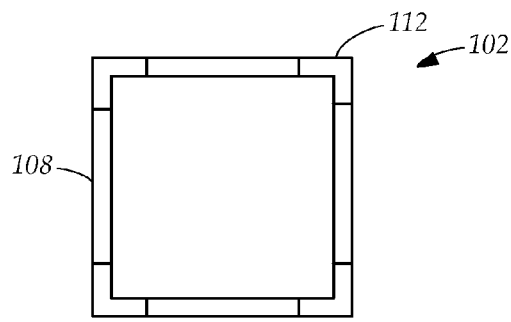
FIG. 7A shows a top view of an example embodiment of an enclosure device according to the present disclosure.

FIG. 7A shows a top view of an example embodiment of an enclosure device according to the present disclosure. Some elements of this figure are described above. Thus, same and/or similar reference characters identify same and/or like components described above and any repetitive detailed description thereof will hereinafter be omitted or simplified in order to avoid complication.

Frame 102 is square. Frame 102 can be a parallelogram or a quadrilateral.

Figure 7B:
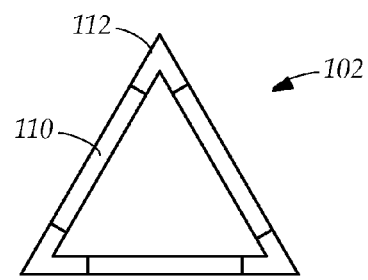
FIG. 7B shows a top view of another example embodiment of an enclosure device according to the present disclosure.

FIG. 7B shows a top view of another example embodiment of an enclosure device according to the present disclosure. Some elements of this figure are described above. Thus, same and/or similar reference characters identify same and/or like components described above and any repetitive detailed description thereof will hereinafter be omitted or simplified in order to avoid complication.

Frame 102 is triangular, such as a right triangle, an equilateral triangle, an isosceles triangle, a scalene triangle, an acute triangle or an obtuse triangle.

Figure 7C:
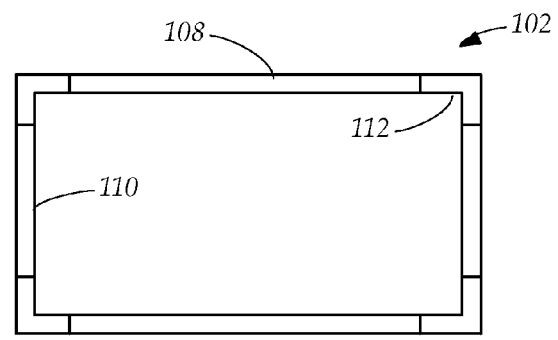
FIG. 7C shows a top view of yet another example embodiment of an enclosure device according to the present disclosure.

FIG. 7C shows a top view of yet another example embodiment of an enclosure device according to the present disclosure. Some elements of this figure are described above. Thus, same and/or similar reference characters identify same and/or like components described above and any repetitive detailed description thereof will hereinafter be omitted or simplified in order to avoid complication.

Figure 7D:
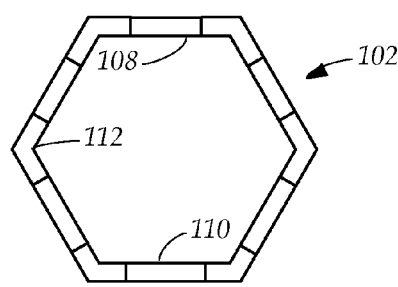
FIG. 7D shows a top view of yet even another example embodiment of an enclosure device according to the present disclosure.

FIG. 7D shows a top view of yet even another example embodiment of an enclosure device according to the present disclosure. Some elements of this figure are described above. Thus, same and/or similar reference characters identify same and/or like components described above and any repetitive detailed description thereof will hereinafter be omitted or simplified in order to avoid complication.

Figure 7E:
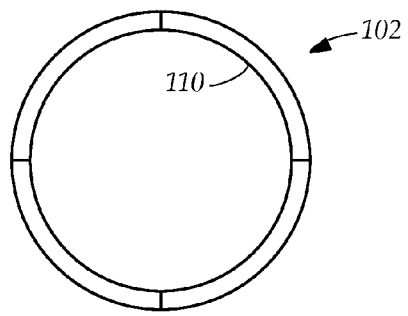
FIG. 7E shows a top view of still another example embodiment of an enclosure device according to the present disclosure.

FIG. 7E shows a top view of still another example embodiment of an enclosure device according to the present disclosure. Some elements of this figure are described above. Thus, same and/or similar reference characters identify same and/or like components described above and any repetitive detailed description thereof will hereinafter be omitted or simplified in order to avoid complication.

Frame 102 is circular. Frame 102 can also be oval.

Figure 8:
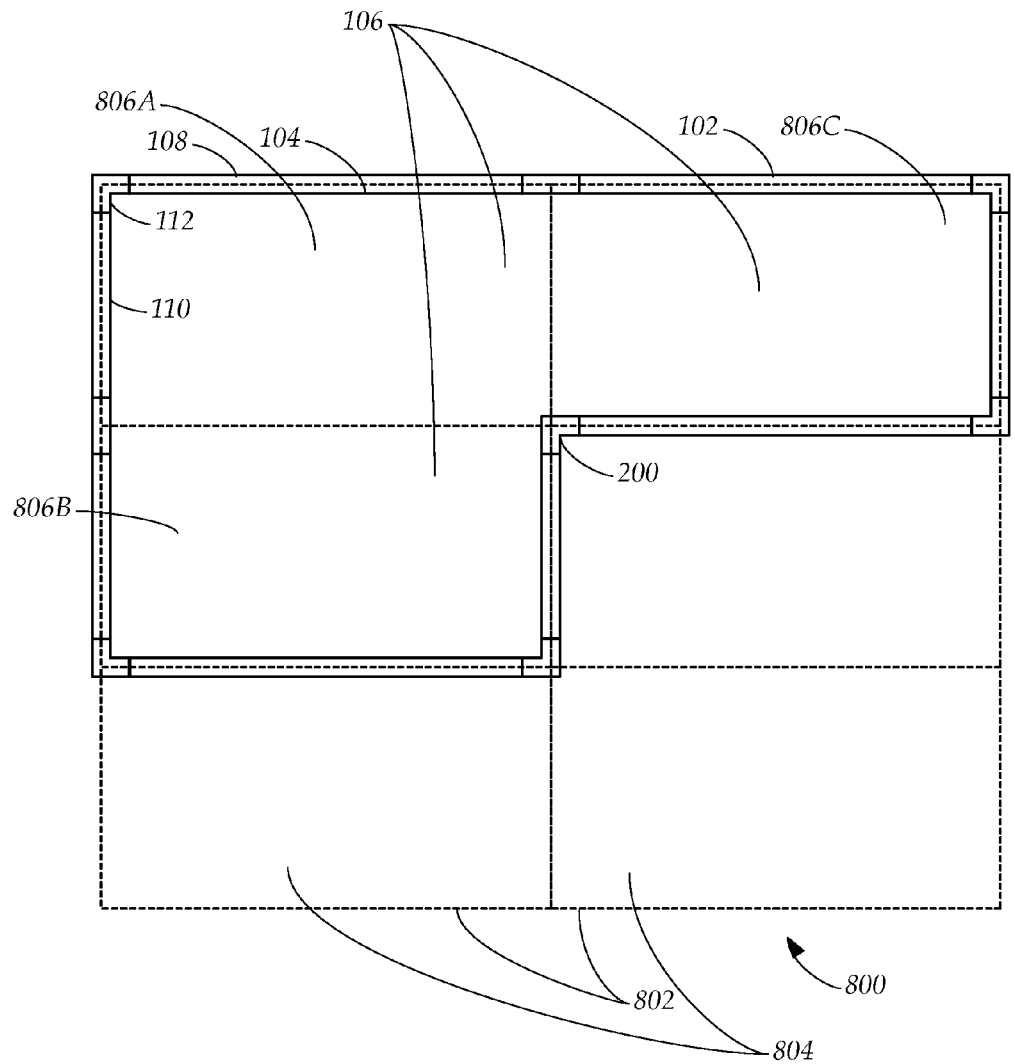
FIG. 8 shows a top view of an example embodiment of an enclosure device installed onto a dropped ceiling grid to enclose a plurality of grid cells according to the present disclosure according to the present disclosure.

FIG. 8 shows a top view of an example embodiment of an enclosure device installed onto a dropped ceiling grid to enclose a plurality of grid cells according to the present disclosure according to the present disclosure. Some elements of this figure are described above. Thus, same and/or similar reference characters identify same and/or like components described above and any repetitive detailed description thereof will hereinafter be omitted or simplified in order to avoid complication.

A dropped ceiling grid 800 includes a plurality of cells 802 having a plurality of openings 804. Cells 802 include cells 806A, 806B and 806C, which are fully enclosed by frame 102 having perimeter 104. Note that area 106 includes areas of cells 806A, 806B and 806C. Also, note that frame 102 uses section 200 such that area 201 faces area 106. Further, note that longitudinal section 108 includes a plurality of sections, identical and non-identical in length.

Figure 9A:
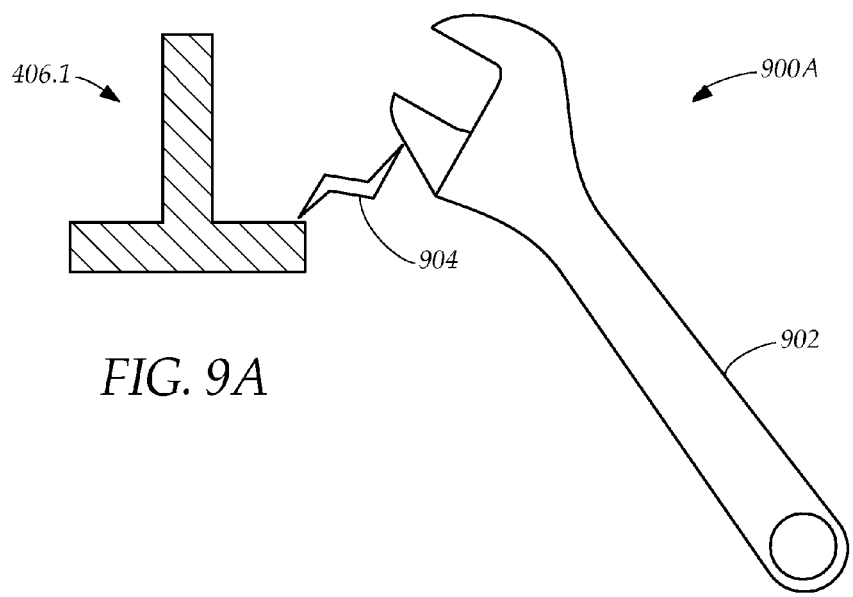
FIG. 9A shows a side view of a dropped ceiling grid cell element receiving an electric current from a tool according to the present disclosure.

FIG. 9A shows a side view of a dropped ceiling grid cell element receiving an electric current from a tool according to the present disclosure. Some elements of this figure are described above. Thus, same and/or similar reference characters identify same and/or like components described above and any repetitive detailed description thereof will hereinafter be omitted or simplified in order to avoid complication.

An environment 900A depicts element 406.1, which is conductive, such as metallic, and a wrench 902, which is conductive, such as metallic. Wrench 902 can be held by a user or be attached to the user, such as via an equipment belt. Another conductive tool or an instrument can also be held by the user or be attached to the user. Wrench 902 comes in contact with element 406.1. If the user comes in contact with operating electrical equipment, such as a live wire above element 406.1, then without frame 102, the user becomes a conduit for an electric current 904. Resultantly, an electric circuit is created between the equipment and element 406.1 with the user and wrench 902 becoming part of the circuit thereby conducting current 904. If current 904 has high voltage, such 200 volts AC or DC, then the user can be injured or killed.

Figure 9B:
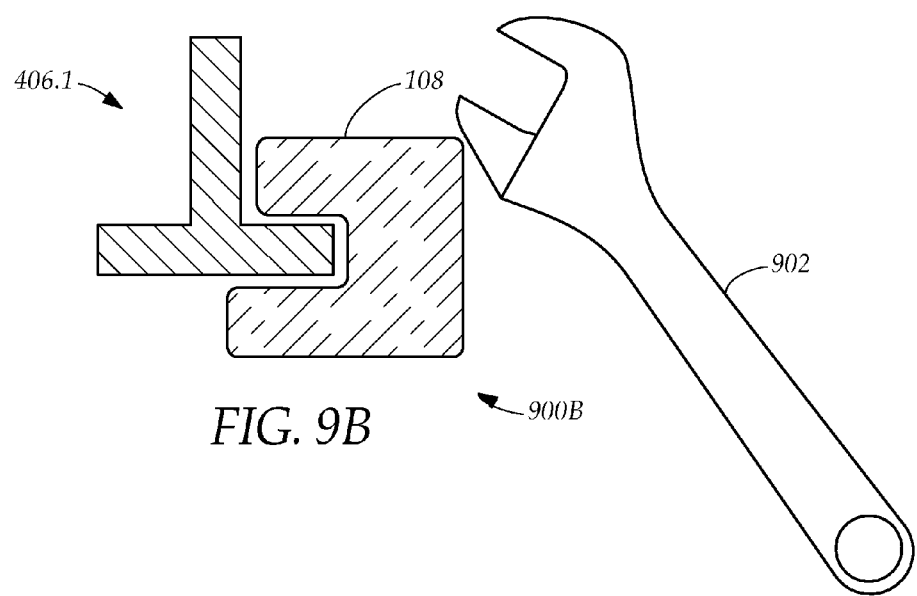
FIG. 9B shows a side view of an example embodiment of an enclosure device resisting conduction of an electric current from a tool according to the present disclosure.

FIG. 9B shows a side view of an example embodiment of an enclosure device resisting conduction of an electric current from a tool according to the present disclosure. Some elements of this figure are described above. Thus, same and/or similar reference characters identify same and/or like components described above and any repetitive detailed description thereof will hereinafter be omitted or simplified in order to avoid complication.

If the user comes in contact with the operating electrical equipment, such as a live wire above element 406.1, then frame 102, such as via section 108, insulates the user from the cell and thereby prevents the user from becoming a conduit for electric current 904 due to frame 102 electrical insulating properties. Resultantly, an electric circuit is not created between the equipment and element 406.1. The user and wrench 902 are thus not part of the circuit and thereby not conducting current 904. If current 904 has high voltage, such 100 volts AC or DC, then the user will not be injured or killed.

Figure 10:
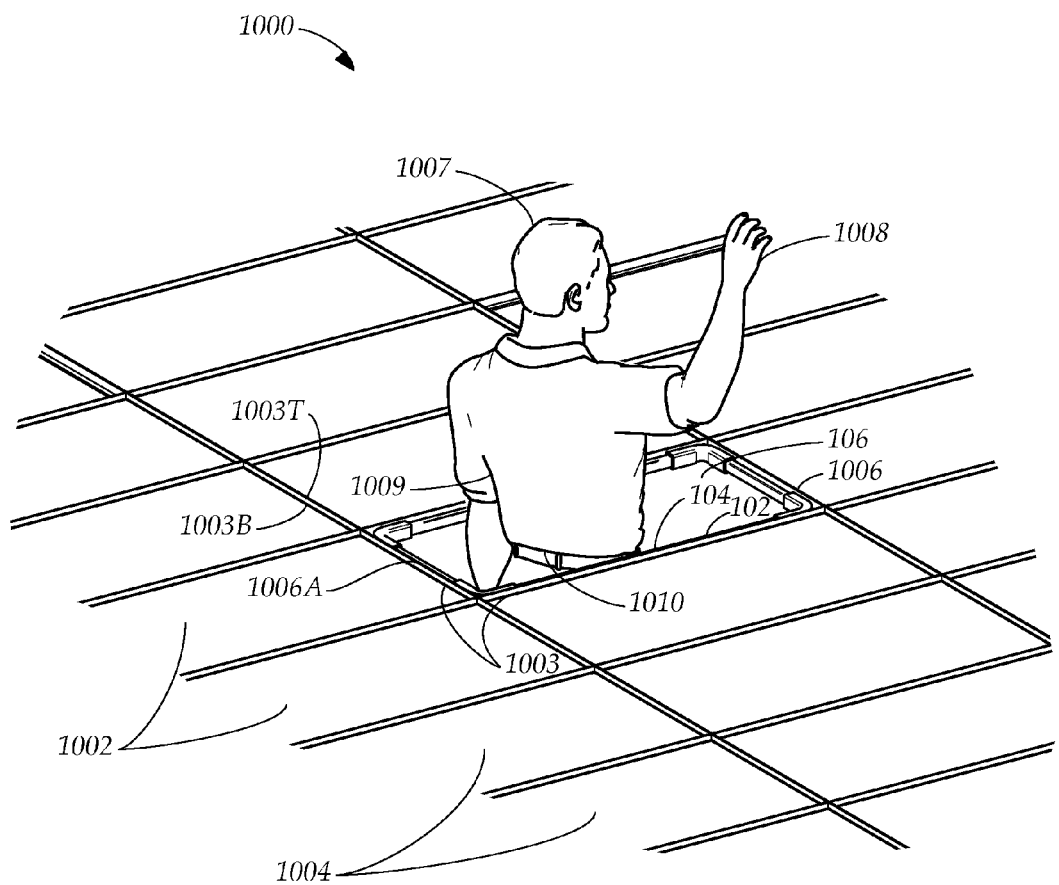
FIG. 10 shows a perspective view of a user enclosed by an example embodiment of an enclosure device installed onto a dropped ceiling grid cell according to the present disclosure.

FIG. 10 shows a perspective view of a user enclosed by an example embodiment of an enclosure device installed onto a dropped ceiling grid cell according to the present disclosure. Some elements of this figure are described above. Thus, same and/or similar reference characters identify same and/or like components described above and any repetitive detailed description thereof will hereinafter be omitted or simplified in order to avoid complication.

A dropped ceiling grid 1000 includes a plurality of cells 1002, made up of cell elements 1003, each having a top 1003T and a bottom 10038 which define a plurality of cell openings 1004, which can be covered/spanned by a plurality of tiles, panels, light fixtures and/or vents. Cells 1002 include an open cell 1006, which is not covered by any of the tiles, panels, light fixtures and/or vents, where a user 1008 having a head 1007, a torso 1009 and a waist 1010 is working. The open cell 1006 defines an opening 1006A that is large enough for an average size adult human torso to extend through. Frame 102 is attached to cell 1006 to fully surround, line, or insulate area opening 106, and is nearly the size of the opening such that it does not substantially reduce the size of the cell opening 1006A, as illustrated. The perimeter 104 of frame 102 is thereby sized to fit a user 1008, who is an adult human of average size. Resultantly, user 1008 may comfortably extend his torso 1009 within frame 102, as illustrated up to the waist 1010 of the user 1008, when user 1008 moves vertically through area 106. The frame 102 insulates the cell opening 1006A between the top 1003T and bottom 1003B of the cell members 1003. As an example, one standard for a drop ceiling creates cells that support tiles that are substantially 24 inches by 24 inches. The tile itself may overlap the grid by approximately ½ inch of each of its four edges. When the tile is removed, then, the cell opening 1006A is approximately 23 inches by 23 inches. It is contemplated that the frame 102 described herein will protrude ⅛ inch to one inch into that opening on each side, making the area opening no smaller than 21 inches by 21 inches, and most likely considerably larger. Using this example, the area opening 106 would be at least 83.3% of the cell opening 1006A, and most likely closer to 99% of the cell opening. In the example illustrated in FIG. 10, a configuration is shown that would likely employ 24 inch by 48 inch tiles. The same principles analogous calculations, and generosity of the frame opening would apply. Note that the frame may be positioned on the cell opening 1006A before a worker extends his body (head or torso) up through the frame (area) opening 106, and then removed after the worker has completed work at the cell opening 1006A.

Figure 11:
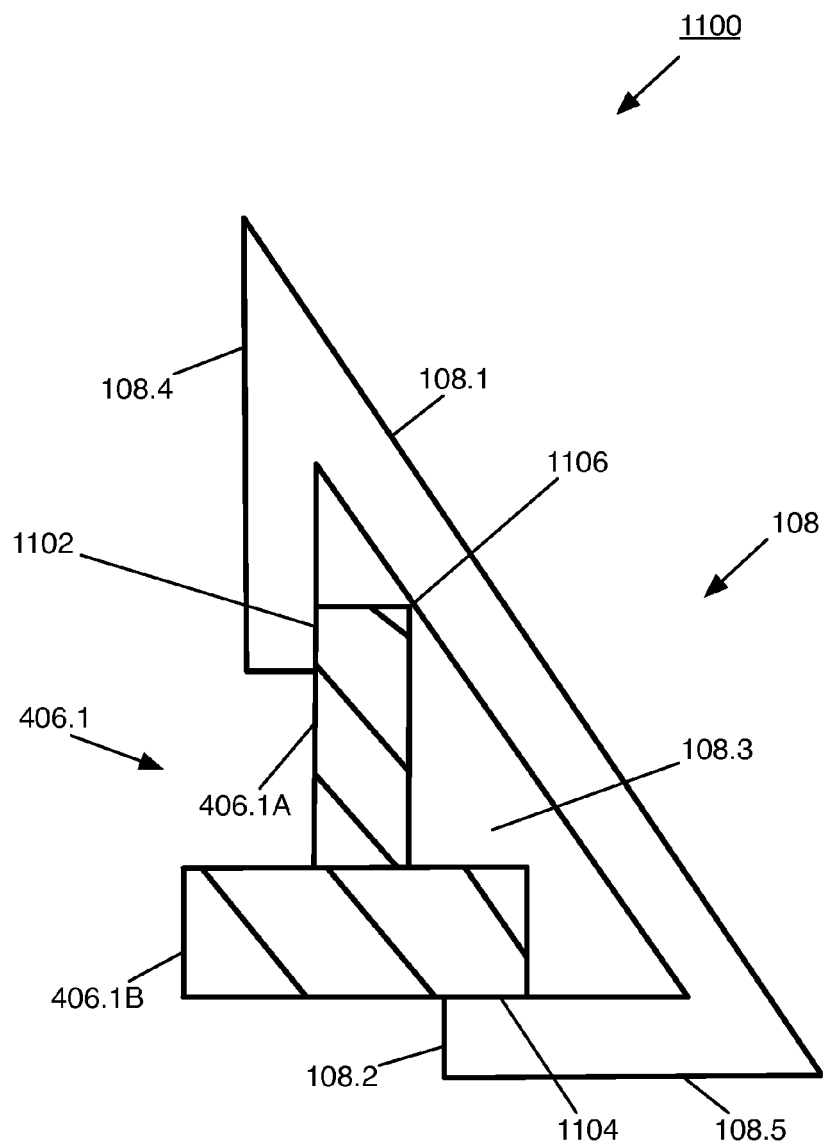
FIG. 11 shows a side view of an example embodiment of a side portion of an enclosure device in contact with a dropped ceiling grid cell element according to the present disclosure.

FIG. 11 shows a side view of an example embodiment of a side portion of an enclosure device in contact with a dropped ceiling grid cell element according to the present disclosure. Some elements of this figure are described above. Thus, same and/or similar reference characters identify same and/or like components described above and any repetitive detailed description thereof will hereinafter be omitted or simplified in order to avoid complication.

A dropped ceiling 1100 includes cell element 406.1, which has leg 406.1A and arms 406.1B. Side 108.1 is in contact with leg 406.1A in at least one point 1006. Side 108.4 is in contact with leg 406.1A in at least one point 1102. Side 108.5 is in contact with arm 406.1B in at least one point 1004. Channel 108.3 in receipt of a portion of leg 406.1A and arm 406.1B, wherein section 108 of the frame has been clipped on to the leg and arm. Resultantly, side 108.4 is a leg contact portion, side 108.1 is an intermediate portion and side 108.5 is an arm contact portion. The leg portion and the arm portion extend at different ends of the intermediate portion. The leg portion contacts the leg at point 1102 and the arm portion contacts one of the arms at point 1104. Frame 102 or other sections of frame 102 can be structured as shown in FIG. 11.

In another example embodiment, any portion and/or entire frame 102 or any and/or all sections of frame 102 can mix different ways of attaching to the cell. For example, frame 102 can have one and/or more teethed portion, one and/or more adhesive portion, one and/or more bracket portion and one and/or more angled portion and/or any others in any permutational combinations thereof.

In another example embodiment, any portion and/or entire frame 102 or any and/or all sections of frame 102 is foldable via hinges. For example, any and/or all corner sections 112 can be hinged, such as periodically. Any and/or all corner sections 112 are periodically hinged to adapt to any larger openings.

In other embodiments, frame 102 and/or any and/or all sections of frame 102 can be manufactured via several methods. One example of such manufacturing is manual and/or automatic assembly. Another example of such manufacturing method is die-cutting, stamping, molding, 3-D printing and other similar methods, irrespective whether frame 102 is unitary and/or assembled and/or in any permutational combination thereof.

The description of the present disclosure has been presented for purposes of illustration and description, but is not intended to be fully exhaustive and/or limited to the disclosure in the form disclosed. Many modifications and variations in techniques and structures will be apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of this application.

What is claimed is:

1. A safety enclosure method for use by a worker having a body having a head and torso, when working above a dropped ceiling grid having a plurality of cells, the cells including an open cell having a cell opening defined by cell elements, comprising the steps of:
providing a rectangular frame having a continuous perimeter made of frame sections, the frame sections made of an electrically insulative material, the frame sections defining a rectangular frame opening;
lining the cell opening by positioning the frame within the cell opening by positioning the frame sections against the cell elements;
extending part of the body of the worker through the frame opening; and
removing the frame from the cell.

2. The safety enclosure method as recited in claim 1, wherein the frame opening is substantially as big as the cell opening.

3. The safety enclosure method as recited in claim 2, wherein the cell elements have a substantially T-shaped cross section having an arm and legs, and wherein the step of lining the opening further comprises clipping the frame onto at least one of the legs and the arms.

4. The safety enclosure method as recited in claim 2, wherein the cell elements have a substantially T-shaped cross section having legs that extend sideways, wherein the frame elements have a longitudinally extending channel, and wherein the step of lining the opening further comprises extending the legs into the frame channels.

5. The safety enclosure method as recited in claim 2, wherein the step of extending part of the body of the worker through the frame opening further comprises extending one of the torso and the head of the worker through the frame opening.

6. A safety enclosure method for use by a worker having a body having a head and torso, when working above a dropped ceiling grid having a plurality of cells, the cells including an open cell having a cell opening defined by cell elements, the cell elements each having a top and a bottom, comprising the steps of:
providing a rectangular frame having a continuous perimeter made of frame sections made of an electrically insulative material, the frame sections defining a frame opening:
insulating the cell opening between the top and bottom of the cell elements by positioning the frame within the cell opening by positioning the frame sections against the cell elements, the frame extends fully between the top and bottom of the cell elements;
extending part of the body of the worker through the frame opening; and
removing the frame from the cell.

7. The safety enclosure method as recited in claim 6, wherein the frame opening is at least 83% as large as the cell opening.

8. The safety enclosure method as recited in claim 7, wherein the the cell elements have a substantially T-shaped cross section having an arm and legs, and wherein the step of insulating the opening further comprises clipping the frame onto at least one of the legs and the arms of the cell elements.

9. The safety enclosure method as recited in claim 7, wherein the cell elements have a substantially T-shaped cross section having legs that extend sideways, wherein the frame elements have a longitudinally extending channel, and wherein the step of insulating the opening further comprises extending the legs into the frame channels.

10. The safety enclosure method as recited in claim 7, wherein the step of extending part of the body of the worker through the frame opening further comprises extending one of the torso and the head of the worker through the frame opening.

11. The safety enclosure method as recited in claim 6, wherein the frame opening is at least twenty one inches by twenty one inches.

* * * * *